United States Patent
Newton et al.

(10) Patent No.: US 9,047,621 B1
(45) Date of Patent: Jun. 2, 2015

(54) CONTENT SELECTION FILTER

(75) Inventors: Kevan Newton, Los Angeles, CA (US);
Alan Davidson, Los Angeles, CA (US);
Troy Walker, Los Angeles, CA (US);
Klaus Voelker, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 2208 days.

(21) Appl. No.: 11/763,059

(22) Filed: Jun. 14, 2007

(51) Int. Cl.
*G06Q 30/00* (2012.01)
*G06Q 30/02* (2012.01)

(52) U.S. Cl.
CPC ................................. *G06Q 30/0256* (2013.01)

(58) Field of Classification Search
CPC .............. G06Q 30/00; G06Q 30/0241; G06Q 30/0242; G06Q 30/0244
USPC .................... 705/14.4, 14.41, 14.43
See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,397 A | 12/1998 | Marsh et al. | |
| 5,948,061 A | 9/1999 | Merriman et al. | |
| 6,026,368 A | 2/2000 | Brown et al. | |
| 6,044,376 A | 3/2000 | Kurtzman, II | |
| 6,078,914 A | 6/2000 | Redfern | |
| 6,144,944 A | 11/2000 | Kurtzman, II et al. | |
| 6,167,382 A | 12/2000 | Sparks et al. | |
| 6,269,361 B1 | 7/2001 | Davis et al. | |
| 6,401,075 B1 | 6/2002 | Mason et al. | |
| 6,985,882 B1 | 1/2006 | Del Sesto | |
| 7,039,599 B2 | 5/2006 | Merriman et al. | |
| 7,136,875 B2 | 11/2006 | Anderson et al. | |
| 2007/0088687 A1* | 4/2007 | Bromm et al. | 707/4 |
| 2007/0124425 A1* | 5/2007 | Gross | 709/217 |
| 2007/0168337 A1* | 7/2007 | Onodera et al. | 707/3 |
| 2008/0235092 A1* | 9/2008 | Song et al. | 705/14 |

FOREIGN PATENT DOCUMENTS

WO WO 97/21183 6/1997

OTHER PUBLICATIONS

Reexamination of 95/001,073, filed Sep. 30, 2004, Stone et al.
Reexamination of 95/001,061, filed Sep. 3, 2002, Stone et al.
Reexamination of 95/001,069, filed Jul. 11, 2002, Dean et al.
Reexamination of 95/001,068, filed Dec. 7, 2002, Stone et al.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb 1, 1997.
Baseview Products, Inc., AdManagerPro Administration Manual v. 2.0, Dec. 1998.

(Continued)

*Primary Examiner* — Raquel Alvarez
(74) *Attorney, Agent, or Firm* — Fish & Richardson P.C.

(57) ABSTRACT

One or more keywords associated with a domain are received. The performance of content selected based on the one or more keywords is evaluated against performance of content selected based on a automatic selection process. A determination is made based on the evaluation as to whether to utilize the automatic selection process or the one or more keywords for selecting content for the domain.

11 Claims, 7 Drawing Sheets

(56) References Cited

OTHER PUBLICATIONS

Baseview Products, Inc., ClassManagerPro Administration Manual v. 1.0.5, Feb. 1, 1997.

Business Wire, "Global Network, Inc. Enters Into Agreement in Principle With Major Advertising Agency," Oct. 4, 1999.

Information Access Technologies, Inc., Aaddzz brochure, "The Best Way to Buy and Sell Web Advertising Space," © 1997.

Information Access Technologies, Inc., Aaddzz.com website archive from www. Archive.org, archived on Jan. 30, 1998.

Zeff, R. et al., Advertising on the Internet, 2nd Ed., John Wiley & Sons, 1999.

Dedrick, R., Interactive Electronic Advertising, IEEE, 1994.

Dedrick, R., A Consumption Model for Targeted Electronic Advertising, Intel Architecture Labs, IEEE, 1995.

Request for Reexamination of U.S. Patent No. 7,240,025 B2, Control No. 95/001,073.

Request for Reexamination of U.S. Patent No. 6,446,045 B1, Control No. 95/001,061.

Request for Reexamination of U.S. Patent No. 7,249,059 B2, Control No. 95/001,069.

Request for Reexamination of U.S. Patent No. 6,829,587 B2, Control No. 95/001,068.

* cited by examiner

CONTENT SELECTION FILTER

BACKGROUND

This disclosure relates to information retrieval.

Publishers of web sites can have domains available that have not been sold and/or registered to a company or individual. These domains are referred to as "parked domains." Publishers can place conceptually related content, e.g., advertisements, on the parked domain until the domain is sold or developed.

In some online advertising systems, keywords selected by a publisher are used by an advertising system to select advertisements for the parked domain. The advertisements can also be selected by the advertising system through other selection processes without using the keywords selected by the publisher. A particular selection process, e.g., the keywords or some other process, may exhibit better performance based on a performance measurement. Choosing which selection process to use to optimize performance, however, can be a daunting task, as the performance of a selected process may change over time.

SUMMARY

Disclosed herein are systems, apparatus and methods for filtering content selection processes. In one implementation, one or more keywords associated with a domain are received. The performance of content selected based on the one or more keywords is evaluated against performance of content selected based on a default/automatic selection process. A determination is made based on the evaluation as to whether to utilize the default/automatic selection process or the one or more keywords for selecting content for the domain.

In another implementation, a predetermined selection process for selecting content for a domain is identified. One or more keywords for selecting content for a domain is also identified. Either the predetermined selection process or the one or more keywords is selected as a content selection process for the domain. Performance of the content selected by the content selection process is monitored, and a determination is made as to whether to reselect either the predetermined selection process or the one or more keywords for selecting content for the domain based on the monitoring.

In another implementation, one or more keywords associated with a domain are received. A keyword content selection performance for the domain based on the one or more keywords is evaluated against a default content selection performance for the domain based on a default/automatic selection process, and a determination is made as to whether to utilize the default/automatic selection process or the one or more keywords for selecting content for the domain based on the evaluation.

In another implementation, one or more keywords associated with a domain are received. A keyword content selection performance for the domain based on the one or more keywords is evaluated against default content selection performances for the domain based on one or more default/automatic selection processes, and a determination is made as to whether to utilize the one or more default/automatic selection processes or the one or more keywords for selecting content for the domain based on the evaluation.

In another implementation, a system includes a data store configured to store one or more keywords associated with a domain, and an evaluation engine. The evaluation engine receives one or more keywords associated with a domain, evaluates performance of content selected based on the one or more keywords against performance of content selected based on a default/automatic selection process, and based on the evaluation, determines whether to utilize the default/automatic selection process or the one or more keywords for selecting content for the domain.

The disclosed systems and methods can optionally realize one or more of the following advantages. Monitoring the performance of the advertisements selected using the keywords by the publisher as well as the performance of the advertisements selected using other selection processes can result in an optimization of advertising revenue. Switching between selected selection processes can be utilized to verify the performance of a currently selected process or to identify a better performing selection process. Updating a selection process, e.g., changing a keyword corpus, can cause the updated selection process to be automatically evaluated. These advantages and other advantages may be separately realized by one or more of the example implementations described below.

DETAILED DESCRIPTION

Figure 1:
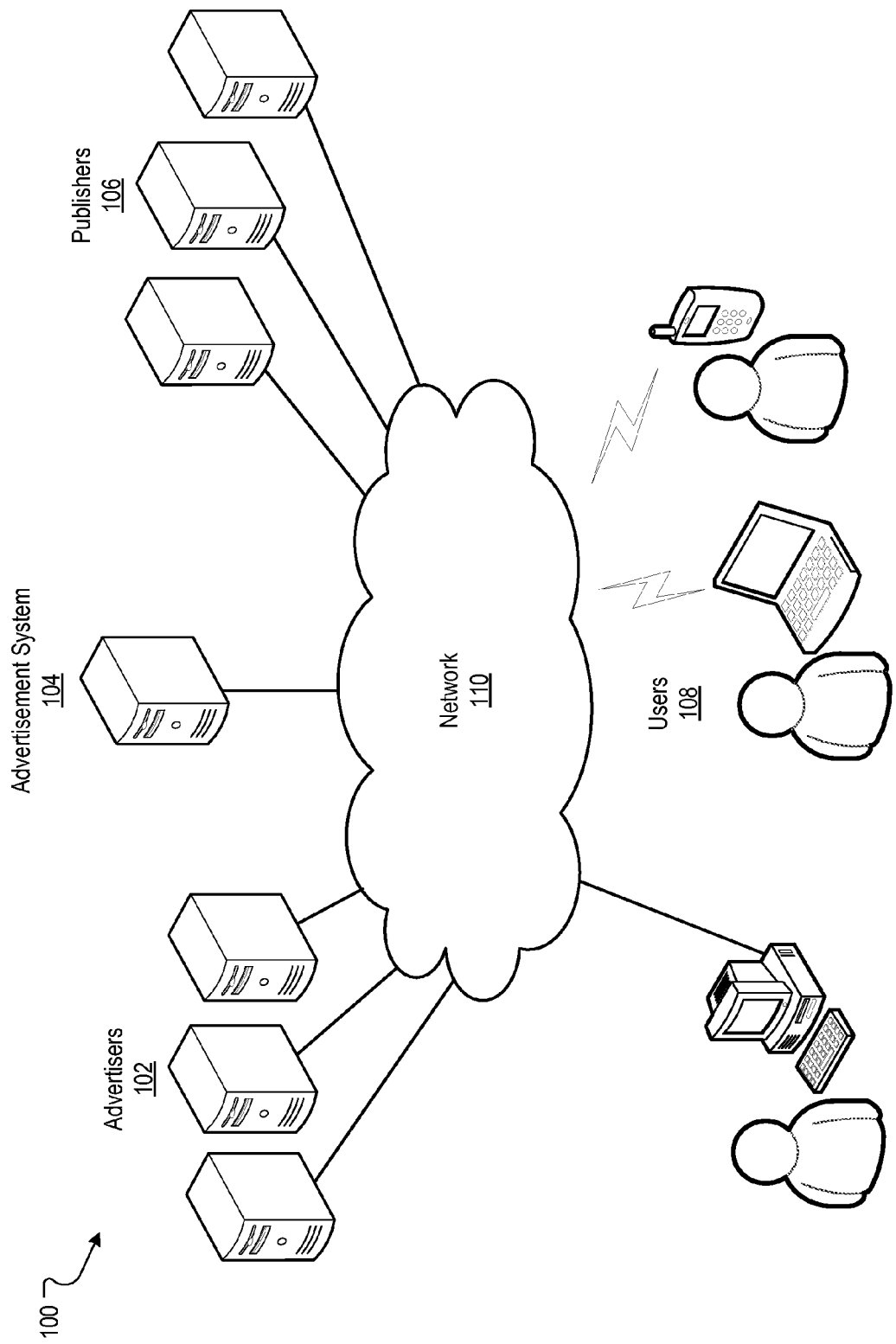
FIG. 1 is a block diagram of an implementation of an online advertising system.

FIG. 1 is a block diagram of an implementation of an online advertising system 100. A computer network 110, such as a local area network (LAN), wide area network (WAN), the Internet, or a combination thereof, connects the advertisers 102, an advertising system 104, publishers 106, and users 108.

In some implementations, one or more advertisers 102 can directly, or indirectly, enter, maintain, and track advertisement ("ad") information in an advertisement system 104. The advertisements may be in the form of graphical advertisements, such as banner advertisements, text only advertisements, image advertisements, audio advertisements, video advertisements, advertisements combining one of more of any of such components, etc. The advertisements may also include embedded information, such as links, meta-information, and/or machine executable instructions. One or more publishers 106 may submit requests for advertisements to the system 104. The system 104 responds by sending advertisements (e.g., when an associated publication is rendered) to the requesting publisher 106 for placement on one or more of the publisher's web properties (e.g., websites and other network-distributed content). While reference is made to advertisements, other content items can be provided by the system 104.

Other entities, such as users 108 and the advertisers 102, can provide usage information to the system 104, such as, for example, whether a click-through related to an advertisement has occurred, whether a conversion has occurred, or whether some other defined event has occurred. Such usage information can be processed to measure performance metrics, such as click-through rates, conversion rates, etc.

A click-through can occur, for example, when a user of a user device, selects or "clicks" on an advertisement. The click-through rate can be a performance metric that is obtained by dividing the number of users that clicked on the advertisement or a link associated with the advertisement by the number of times the advertisement was delivered. For example, if an advertisement is delivered 100 times, and three persons clicked on the advertisement, then the click-through rate for that advertisement is 3%.

A "conversion" occurs when a user, for example, consummates a transaction related to a previously served advertisement. What constitutes a conversion may vary from case to case and can be determined in a variety of ways. For example, a conversion may occur when a user clicks on an advertisement, is referred to the advertiser's Web page and consummates a purchase there before leaving that Web page. Alternatively, a conversion may be defined as a user being shown an advertisement, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, dialing a telephone number, sending a product or service inquiry, etc. Other definitions of what constitutes a conversion are possible.

A conversion rate can be defined as the ratio of the number of conversions to the number of impressions of the advertisement (i.e., the number of times an advertisement is rendered) or the ratio of the number of conversions to the number of selections (or the number of some other earlier event). The type of conversion rate can be apparent from the context in which it is used. If a conversion is defined to be able to occur within a predetermined time since the serving of an advertisement, one possible definition of the conversion rate might only consider advertisements that have been served more than the predetermined time in the past.

Other usage information and/or performance metrics can also be used. The usage information and/or performance metrics can, for example, be revenue related or non-revenue related. In another implementation, the performance metrics can be parsed according to time, e.g., the performance of a particular content item may be determined to be very high on weekends, moderate on weekday evenings, but very low on weekday mornings and afternoons.

This usage information can include measured or observed user behavior related to advertisements that have been served. The system 104 performs financial transactions, such as crediting the publishers 106 and charging the advertisers 102 based on the usage information.

One example of a publisher 106 is a content server (e.g., domain name registrar) that places content (e.g., articles, discussion threads, music, video, graphics, search results, web page listings, information feeds, etc.) on one or more domains. The domain registrar server may submit a request for advertisements to an advertisement server in the system 104. The advertisement request may include a number of advertisements desired. The advertisement request may also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server can combine the requested content with one or more of the advertisements provided by the system 104. This combined content and advertisements can be sent to the user 108 that requested the content for presentation in a viewer (e.g., a browser or other content display system). The content server can transmit information about the advertisements back to the advertisement server, including information describing how, when, and/or where the advertisements are to be rendered (e.g., in HTML or JavaScript™).

As can be appreciated from the foregoing, the advertising management system 104 can serve publishers 106 such as content servers. The system 104 permits serving of advertisements targeted to content (e.g., documents) served by content servers. For example, a network or inter-network may include an advertisement server serving targeted advertisements in response to requests from a content server with advertisement spots. Suppose that the inter-network is the World Wide Web. One or more content servers may include one or more documents. Documents may include web pages, email, content, embedded information (e.g., embedded media), meta-information and machine executable instructions, and advertisement spots. The advertisements inserted into advertisement spots in a document can vary each time the document is served or, alternatively, can have a static association with a given document.

In one implementation, the advertisement system 104 may include an auction process to select advertisements for a domain of a content server. Advertisers may be permitted to select, or bid, an amount the advertisers are willing to pay for each click of an advertisement, e.g., a cost-per-click amount an advertiser pays when, for example, a user clicks on an advertisement on a domain. In one implementation, the cost-per-click can include a maximum cost-per-click, e.g., the maximum amount the advertiser is willing to pay for each click of an advertisement. For example, advertisers A, B, and C all select, or bid, a maximum cost-per-click of $0.50, $0.75, and $1.00, respectively. The maximum amount advertiser A will pay for a click is $0.50, the maximum amount advertiser B will pay is $0.75, and the maximum amount advertiser C will pay is $1.00.

In one implementation, the advertisement system 104 can provide content, e.g., advertisements, to a publisher 106 based on one or more keywords received from the publisher 106. The publisher 106 can select one or more keywords and receive advertisements related to the keywords for the publisher's domain. The advertisement system 104 can also select advertisements for a publisher 106 using one or more default content selection processes. In some implementations, to maximize revenue or a given metric, e.g., click-through rate or a conversion rate, the advertisement system 104 can determine whether to use the one or more keywords in selecting advertisements for the publisher 106 or use a default/automatic selection process to select the advertisements. The advertisement system 104 can evaluate the performance of the advertisements selected by both processes and determine which process to use based on the evaluation.

Figure 2:
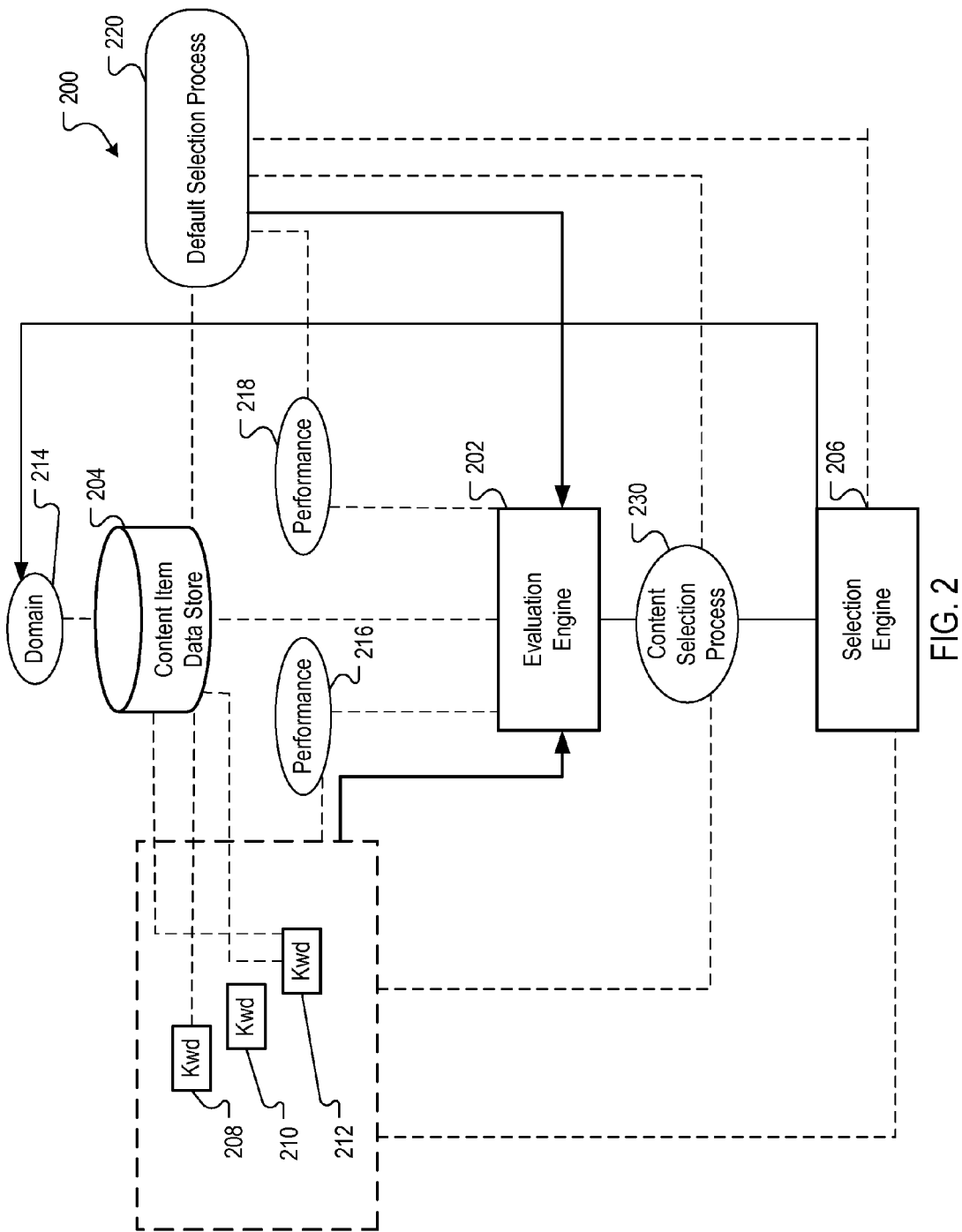
FIG. 2 is a block diagram of an example content selection evaluation system.

FIG. 2 is a block diagram of an example content selection evaluation system 200. The content selection evaluation system 200 can, for example, be implemented in the advertisement system 104 utilizing one or more computing devices that include memory devices storing processing instructions and processing devices for executing the processing instructions. An example computing system is shown and described with reference to FIG. 8. Other implementations, however, can also be used.

In one implementation, the content selection evaluation system 200 can, for example, evaluate the performance of advertisements selected by using one or more keywords chosen by a publisher 106 against the performance of advertisements selected by a default or automatic selection process 220. The performance can, for example, be evaluated based on parameters associated with the respective advertisements, e.g., cost-per-click, a conversation rate, and/or revenue generated by each advertisement. The content selection evaluation system 200 can be used to select the process that identifies the best-performing advertisements for the publisher 106 as a selected content selection process 230 for identifying and serving advertisements for the publisher 106. The content selection evaluation system 200 can, for example, include an evaluation engine 202, a content item data store 204, and a selection engine 206. In one implementation, the content item data store 204 can comprise a unitary data store, such as a hard drive. In another implementation, the content data store 204 can comprise a distributed data store, such as a storage system that is distributed over a network. Other implementations, however, can also be used.

The content data store 204 can, for example, store one or more advertisements. Each advertisement in the content data store 204 can be associated with one or more performance metrics, e.g., click-through rates, and auction metrics, e.g., cost-per-clicks, etc. In one implementation, the content selection evaluation system 200 can monitor and/or evaluate performance data related to the advertisements in the content data store 204. For example, the performance of each advertisement in the content data store 204 can be evaluated based on a performance metric and/or an auction metric associated with the advertisement, such as a click-through rate or a revenue generated by the cost-per-click.

In one implementation, the evaluation engine 202 can, for example, receive more keywords 208, 210, 212 associated with a domain 214. The one or more keywords 208, 210, 212 can, for example, be used to select content, e.g., advertisements for the domain 214, and can be selected by a publisher 106 associated with the domain 214.

In one implementation, the evaluation engine 202 can, for example, evaluate the performance 216 of content selected based on the one or more keywords 208, 210, 212 against performance 218 of content selected based on a default/automatic selection process 220. The selection engine 206 can use the one or more keywords 208, 210, 212 to select content e.g., advertisements for the domain 214. The selected content can be presented on the domain 214, and the evaluation engine 202 can monitor the performance 216 of the selected content, such as click and revenue statistics associated with the content, e.g., click-through rate of the content and revenue the content generates.

The next time content is requested for the domain 214, the selection engine 206 can, for example, use a default/automatic selection process 220 to select content for the domain 214. In one implementation, the default/automatic selection process 220 can include parsing the domain name data related to the domain 214 to select the content. The evaluation engine 202 can, for example, monitor the performance 218 of the content selected based on the default/automatic selection process 220.

In one implementation, the performance 216 of the content selected using the one or more keywords 208, 210, 212 is an average performance. The performance 216 can be calculated by adding the performance statistics and dividing by the total number of times the content was rendered based on the one or more keywords 208, 210, 212. For example, suppose an advertisement has a cost-per-click amount of $0.30. If the advertisement is selected by the one or more keywords 208, 210, 212 three times, and clicked on 2 times, then the average click-through rate is ⅔ or 66% and the average revenue generated is ($0.30+$0.30)/3 or $0.20. Likewise, the performance 218 of the content selected using the default/automatic selection process 220 can be an average performance. The performance 218 can be calculated by adding the performance statistics and dividing by the total number of times the content was rendered based on the default/automatic selection process 220.

In one implementation, the evaluation engine 202 can, for example, determine whether to utilize the default/automatic selection process 220 or the one or more keywords 208, 210, 212 for selecting content for the domain 214. In one implementation, the evaluation engine 202 can make the determination after each of the content selection processes have been used to gather a reliable corpus of data to evaluate performance statistics for each method. For example, the evaluation engine 202 can make the determination of whether to the default/automatic selection process 220 or the one or more keywords 208, 210, 212 for selecting content for the domain 214 after each selection method has been used at least 100 times; or after each selection method has been used for a given time period, e.g., two days, etc.

The evaluation engine 202 can, for example, attempt to maximize the click-through rate and/or the revenue by selecting a content selection process, e.g., the one or more keywords 208, 210, 212 or the default/automatic selection process 218, that performs best according to the statistics e.g., click-through rate and revenue generated, gathered so far. For example, if the average click-through rate of the process using the one or more keywords 208, 210, 212 is higher than the average click-through rate of the content selection process using the default/automatic selection process 220, the evaluation engine 202 can select the one or more keywords 208, 210, 212 as the content selection process 230.

In one implementation, the evaluation engine 202 can, for example, periodically re-evaluate the performance of content selected based on the unselected one of the default/automatic selection process or the one or more keywords 208, 210, 212 against the performance of content selected based on the content selection process 230. The performance of the content selected using the content selection process 230 can, for example, be updated every time the content selection process 230 is used to select the content. In one implementation, the performance of the content selected using the content selection process 230 is an average performance, calculated by taking an average of the performance of the content each time the content selection process 230 is used to select content. For example, each time content is requested from the advertisement system 104, the performance of the content selected based on the unselected one of the default/automatic selection process 220 or the one or more keywords 208, 210, 212 can be compared to use the average performance of the content selected by the content selection process 230.

The evaluation engine 202 can, for example, reselect one of the default/automatic selection process 220 or the one or more keywords 208, 210, 212 as the content selection process 230 based on the periodic evaluation. For example, suppose the content selection process 230 is the default/automatic selection process 220, and the average performance of the content selected by the content selection process 230 is worse than the performance of the content selected based on the unselected one or more keywords 208, 210, 212. The evaluation engine 202 can, therefore, reselect the one or more keywords 208, 210, 212 as the content selection process 230. If the average performance of the content selected by the content selection process 230 is the same or better than the performance of the content selected based on the unselected one or more keywords 208, 210, 212, then the evaluation engine 202 can reselect the default/automatic selection process 220 as the content selection process 230.

In one implementation, the evaluation engine 202 can, for example, determine if the average click-through rate of the content selected by the content selection process 230 is lower than the average click-through rate of the content selected based on the unselected one of the one of the default/automatic selection process 220 or the one or more keywords 208, 210, 212. Suppose, for example, the content selection process 230 is the default/automatic selection process 220. If the average click-through of the content selected by the content selection process 230 rate is lower than the average click-through of the content selected based on the unselected one or more keywords 208, 210, 212, the evaluation engine 202 can reselect the one or more keywords 208, 210, 212 as the content selection process 230. If the average click-through of the content selected by the content selection process 230 is the same or better than the performance of the content selected based on the unselected one or more keywords 208, 210, 212, then the evaluation engine 202 can continue using the default/automatic selection process 220 as the content selection process 230.

In one implementation, the evaluation engine 202 can determine if the average revenue generated by the content selected by the content selection process 230 is higher than the average revenue generated by the content selected based on the unselected one of the one of the default/automatic selection process 220 or the one or more keywords 208, 210, 212. Suppose, for example, the content selection process 230 is the one or more keywords 208, 210, 212. If the average revenue generated by the content selected by the content selection process 230 is higher than the average revenue generated by the content selected based on the unselected default/automatic selection process 220, the evaluation engine 202 can reselect the one or more keywords 208, 210, 212 as the content selection process 230.

In one implementation, the evaluation engine 202 can determine whether to use the one or more keywords 208, 210, 212 or the default/automatic selection process 220 as the content selection process 230 on every request for content to the advertisement system 104. In other implementations, the determination can be made according to a time period, e.g., every minute, hour, day or once a week. For example, for a first request set, e.g., a predefined number of requests, or requests over a time period, content can be selected for the domain 214 using the one or more keywords and the historical performance of the keyword-selected content can be monitored and/or updated. Thereafter, for a second request set, content can be selected for the domain 214 using a default/automatic selection process and the historical performance of the default-selected content can be monitored and/or updated. The resulting performance history indicates that the content selected by the second request set has a higher click-through rate; however, the content selected based on the first request set has generated a greater amount of revenue.

The evaluation engine 202 can, for example, perform an evaluation based on the monitored performance. If the evaluation engine 202 bases the evaluation based on click-through rates, for example, then the content selection engine can select the default/automatic selection process 220 for selecting content. Conversely, if the evaluation engine 202 bases the evaluation based on revenue, for example, then the content selection engine can select the one or more keywords for selecting content.

In another implementation, selection of a content selection process can be based on multiple performance parameters. For example, the selection of a selection process can be based on a function of click-through rates and revenue values.

In some implementations, content performance can be evaluated after each serving of content. For example, suppose on a first request for content sent to the advertisement system 104, first content is selected for a domain 214 using the one or more keywords 208, 210, and 212. The first content has a cost-per-click amount of $0.10 and is clicked on after it is served. The first content thus has a click-through rate of 100% and generated $0.10 in revenue after the first request. Thereafter, second content is selected on a second request for the domain 214 using the default/automatic selection process 220. On the second request, the performance 218 is monitored for the second content selected using the default/automatic selection process 220. The second content has a cost-per-click amount of $0.20, and is clicked after it is served. Therefore, the second content has a click-through rate of 100% and generated $0.20 in revenue after the second request.

Suppose on the third request, the evaluation engine 202 determines additional click-through and revenue statistics are required to select either the one or more keywords 208, 210, 212, or the default/automatic selection process 220 as the content selection process 230. Therefore, on the third request, the evaluation engine 202 selects third content based on the one or more keywords 208, 210, 212. The third content has a cost-per-click amount of $0.20 but is not clicked on after it is served. Therefore, the third content has a click-through rate of 0% and generates $0 in revenue for the third request.

Suppose on the fourth request, the evaluation engine 202 determines again additional click-through and revenue statistics are required to select either the one or more keywords or the default/automatic selection process 220 as the content selection process 230. Therefore, on the fourth request, the evaluation engine 202 selects fourth content based on the default/automatic selection process 220. The fourth content has a cost-per-click amount of $0.50 and is clicked on after it is served. Therefore, the fourth content has a click-through rate of 100% and generates $0.50 in revenue on the fourth request.

As additional content is selected and served, performance data for content selected based on the default/automatic selection process and the one or more keywords is gathered until a corpus sufficient to identity the best performing selection process is generated. In some implementations, the performance for each selection process can be based on an averaged statistic. The average click-through rate, for example, of the content selected using the default/automatic selection process 220 or the one or more keywords 208, 210, 212 can be calculated as:

$$(CTR_1 + CTR_2 + \ldots + CTR_n)/n \text{ request}$$

Where $CTR_i$ is the click-through rate of the content for request i, as i ranges from 1 to n. In this example, n=2, and thus the average click-through rate of the content selected using the default/automatic selection process 220 can be calculated as:

$$(100\% + 100\%)/2 = 100\%$$

Likewise, the average click-through rate of the content selected using the one or more keywords 208, 210, 212 can be calculated as:

(100%+0%)/2=50%

Average revenue can be calculated in a similar manner. Therefore, in this example, the average revenue generated by the content selected using the default/automatic selection process 220 can be calculated as:

($0.20+$0.50)/2=$0.35

The average revenue generated by the content selected using the one or more keywords 208, 210, 212 can be calculated as:

($0.10+$0)/2=$0.05

The evaluation engine 202 can, for example, evaluate the performance of the content selected by the default/automatic selection process 220, e.g., average click-through rate of 100% and average revenue generated of $0.35 against the performance of the content selected by the one or more keywords 208, 210, 212 e.g., average click-through rate of 50% and average revenue generated of $0.05. The evaluation engine 202 can, for example, maximize the performance based on the click-through rates and determine that the performance of the content selected by the default/automatic selection process 220 is better than the performance of the content selected by the one or more keywords 208, 210, 212 because the average click-through rate 100% is higher than the average click-through rate of 50%. The evaluation engine 202 can, for example, select the default/automatic selection process 220 as the content selection process 230.

In one implementation, the evaluation engine 202 can determine whether the one or more keywords 208, 210, 212 have been modified. For example, the publisher 106 can select or provide new keywords for the selection engine 206 to use to select advertisements for the domain 214. The publisher 106 can, for example, change any number of the keywords 208, 210, 212. The publisher 106 can also add more keywords to the group of keywords 208, 210, 212.

In one implementation, if the one or more keywords 208, 210, 212 have been modified, the evaluation engine 202 can, for example, reevaluate the performance 218 of content selected based on the default/automatic selection process 220 against the performance 216 of content selected based on the one or more keywords 208, 210, 212. For example, if the one or more keywords 208, 210, 212 have been modified, the selection engine 206 can select different content for the domain 214 than the content selected using the original keywords 208, 210, 212. Therefore, the performance 214 associated with the content selected using the keywords 208, 210, 212 can change. The evaluation engine 202 can, for example, compare the performance 214 of the content selected using the modified keywords 208, 210, 212 against the performance 216 of content selected based on the default/automatic selection process 220.

In one implementation, the evaluation engine 202 can reselect one of the default/automatic selection process or the one or more keywords as the content selection process based on the reevaluation. For example, if the performance 216 of the content selected by the default/automatic selection process 220 is better than the performance 214 of the content selected by the modified one or more keywords 208, 210, 212, then the evaluation engine 202 can select the default/automatic selection process 220 as the content selection process 230. If the performance 216 of the content selected by the default/automatic selection process 220 is worse than the performance 214 of the content selected by the modified one or more keywords 208, 210, 212, then the evaluation engine 202 can select the one or more keywords 208, 210, 212 as the content selection process 220.

In one implementation, content requests can be apportioned for selection of content by the one or more keywords and the default/automatic selection process 220. The selection engine 206 can, for example, select content for a first portion of the content requests based on the one or more keywords 208, 210, 212. The selection engine 206 can, for example, select content for a second portion of the content request based on the default/automatic selection process 220. The evaluation engine 202 can, for example, evaluate the performance 214 of the content selected for the first portion of requests based on the one or more keywords 208, 210, 212 against performance 216 of the content selected for the second portion of content requests based on the a default/automatic selection process 220.

For example, the click-through rates and revenue generated by the content selected for the first portion of requests based on the one or more keywords 208, 210, 212 can be compared to the click-through rates and revenue generated by the content selected for the second portion of requests based on the default/automatic selection process 220. The evaluation engine 202 can reselect one of the default/automatic selection process 220 or the one or more keywords as the content selection process 230 based on the evaluation of the performance of the content selected for the first portion and the content select for the second portion.

In one implementation, the evaluation engine 202 can select the one or more keywords as the content selection process 230 or the default/automatic selection process 220 as the content selection process 230 based on the likelihood that a particular process will perform better than the other. For example, if performance data related to content performance selected by the one or more keywords and the default/automatic selection process 220 indicates that the default/automatic selection process is 90% likely to select better-performing content, then the default/automatic selection process 220 can be selected as the content selection process 230 approximately 90% of the time.

In another implementation, the evaluation engine 202 can select the one or more keywords as the content selection process 230 or the default/automatic selection process 220 as the content selection process 230 to verify a current selection state of the content selection process 230. For example, the default/automatic selection process 220 may be selected as the content selection process 230. The evaluation engine 202 may periodically select the one or more keywords as the content selection process 230 for sufficient content requests to verify that the default/automatic selection process 220 still exhibits a better performance. For example, the one or more keywords may be selected as the content selection process 230 for a verification period, e.g., 100 content requests, or six hours, or some other defined period. If, after the verification period, the content selected by the one or more keywords do not exhibit an adequate performance increase, the evaluation engine 202 can revert back to the default/automatic selection process 220 as the content selection process 230.

In another implementation, the evaluation engine 202 can evaluate performance 216 of content based on the one or more keywords 208, 210, 212 against performance of content selected based on one or more default/automatic selection processes 220. In one implementation, the evaluation engine 202 can, for example, determine whether to utilize one of the one or more default/automatic selection processes 220 or the one or more keywords 208, 210, 212 for selecting content for the domain 214. In one implementation, the evaluation engine 202 can make the determination after each of the content selection processes have been used to gather a reliable corpus of data to evaluate performance statistics for each method.

In one implementation, the evaluation engine can evaluate performance of content based on other attributes of content against performances of content selected based on one or more default/automatic selection processes 220. The attributes can, for example be selected by a publisher by filing out a profile associated with the domain 214. For example, the publisher can specify one or several verticals associated with the domain. The publisher can, for example, select one business vertical. The profile can include a question requiring the publisher to select one or more products or services offered by the publisher, or a question regarding the business name. The attributes such as business name and the one or more products or services can be used to select content for the domain 214. The evaluation engine 202 can evaluate the performance of the content based on these attributes.

Figure 3:
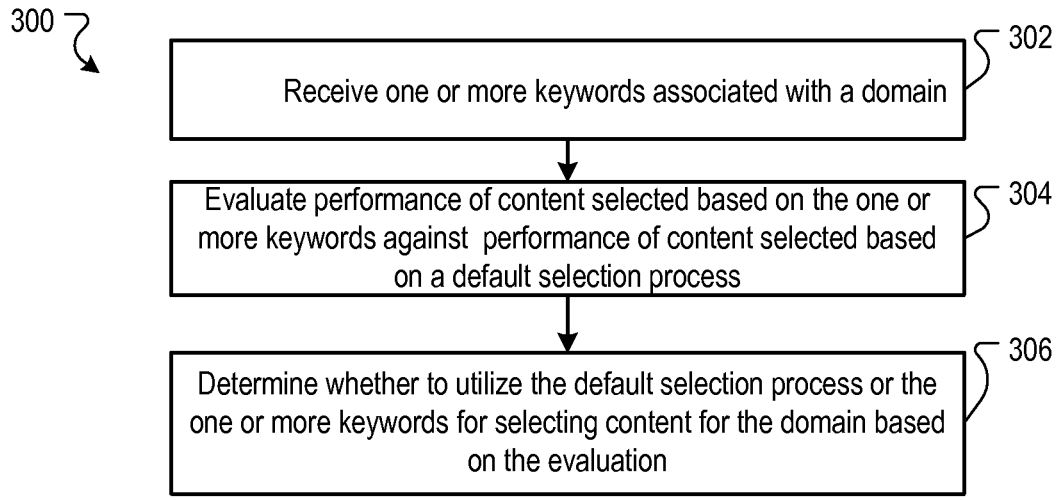
FIG. 3 is a flow diagram of an example process for filtering content selection methods.

FIG. 3 is a flow diagram of an example process 300 for filtering content selection methods. The process 300 can, for example, be implemented in a system such as the content selection evaluation system 200 of FIG. 2.

Stage 302 receives one or more keywords associated with a domain. For example, the evaluation engine 202 can receive one or more keywords associated with a domain.

Stage 304 evaluates performance of content selected based on the one or more keywords against performance of content selected based on a default/automatic selection process. For example, the evaluation engine 202 can evaluate performance of content selected based on the one or more keywords against performance of content selected based on a default/automatic selection process 220.

Stage 306 determines whether to utilize the default/automatic selection process or the one or more keywords for selecting content for the domain based on the evaluation. For example, the evaluation engine 202 can determine whether to utilize the default/automatic selection process or the one or more keywords for selecting content for the domain based on the evaluation.

Figure 4:
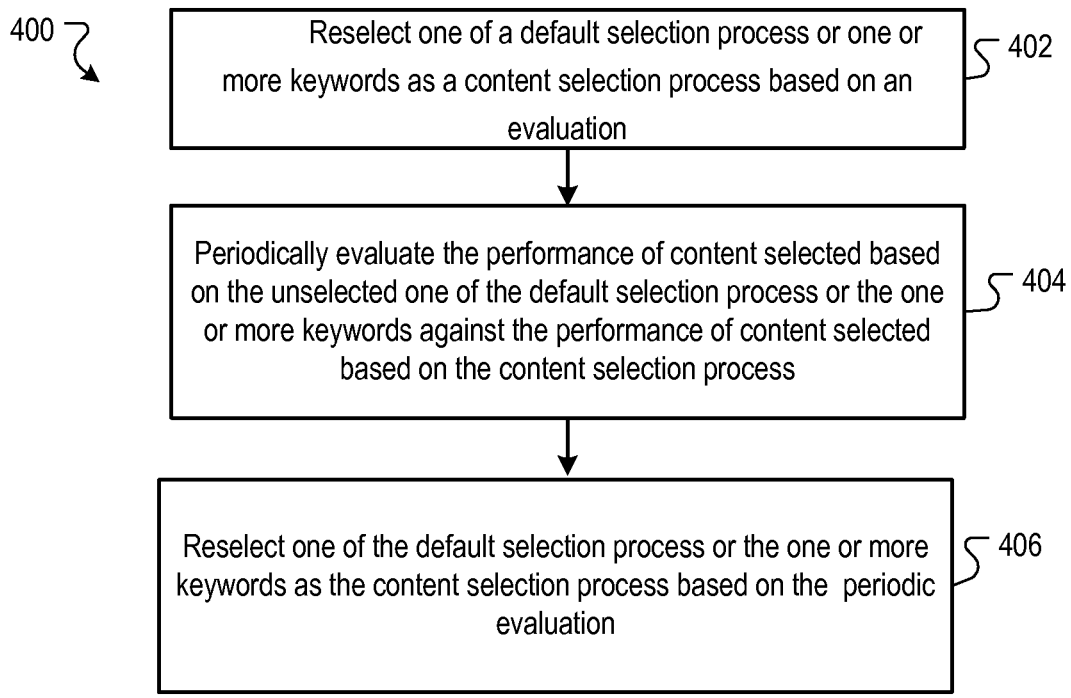
FIG. 4 is an example process for filtering content selection methods based on evaluating performance of content.

FIG. 4 is an example process 400 for filtering content selection methods based on evaluating performance of content. The process 400 can, for example, be implemented in a system such as the content selection evaluation system 200 of FIG. 2.

Stage 402 reselects one of a default/automatic selection process or a one or more keywords as a content selection process based on an evaluation. For example, the evaluation engine 202 can reselect one of a default/automatic selection process or one or more keywords as a content selection process based on an evaluation. An evaluation can, for example, include comparing performance associated with the content selected based on the default/automatic selection process against the performance associated with the content selected based on the one or more keywords.

Stage 404 periodically evaluates the performance of content selected based on the unselected one of the default/automatic selection process or the one or more keywords against the performance of content selected based on the content selection process. For example, the evaluation engine 202 can periodically evaluate the performance of content selected based on the unselected one of the default/automatic selection process or the one or more keywords against the performance of content selected based on the content selection process.

Stage 406 reselects one of the default/automatic selection process or the one or more keywords as the content selection process based on the periodic evaluation. For example, the evaluation engine 202 can reselect one of the default/automatic selection process or the one or more keywords as the content selection process based on the periodic evaluation.

Figure 5:
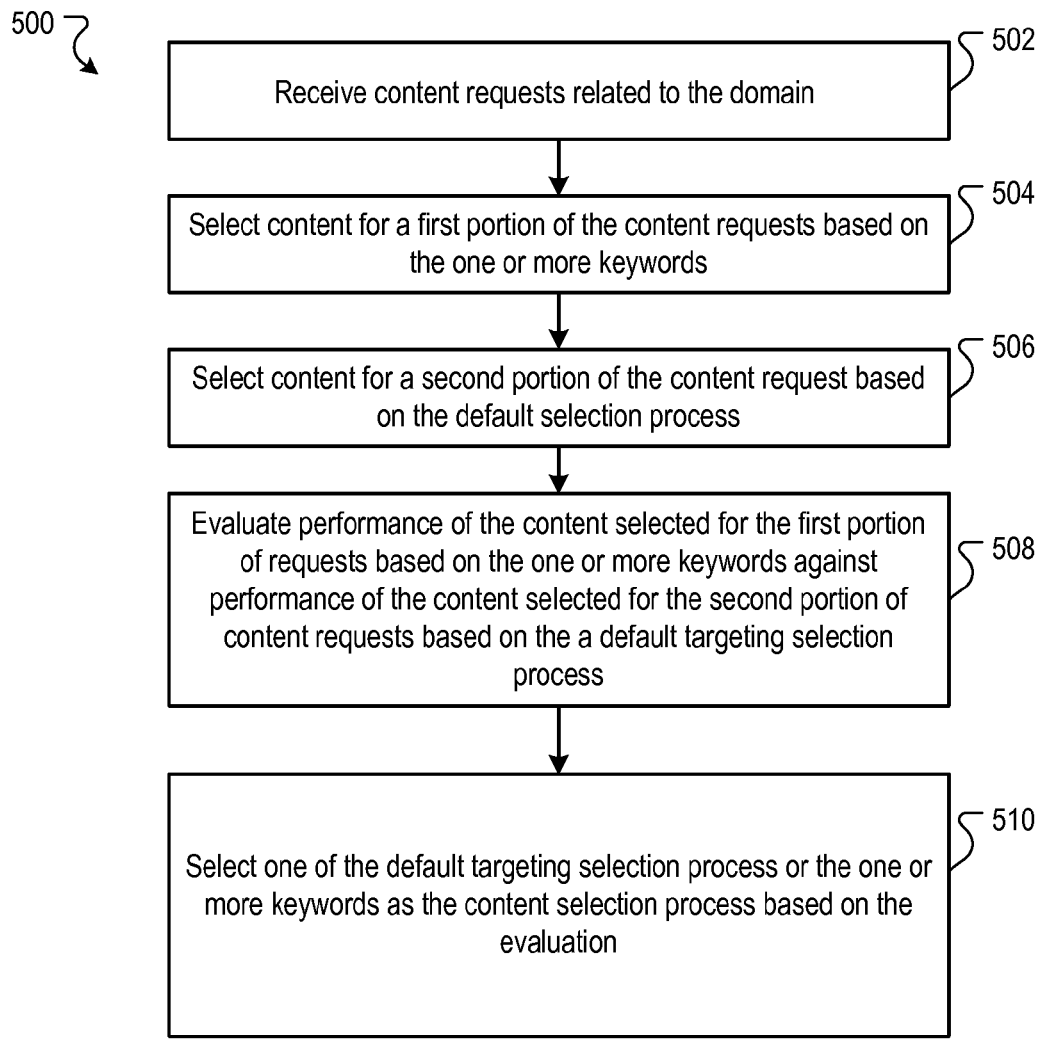
FIG. 5 is an example process for selecting content for a request.

FIG. 5 is an example process 500 for selecting content for a request. The process 500 can, for example, be implemented in a system such as the content selection evaluation system 200 of FIG. 2.

Stage 502 receives content requests related to a domain. For example, the selection engine 206 can receive content requests related to a domain.

Stage 504 selects content for a first portion of the content requests based on the one or more keywords. For example, the selection engine 206 can select content for a first portion of the content requests based on the one or more keywords. The portion can, for example, be based on a percentage distribution, e.g., 1% of all content requests; or on a time period, e.g., 1 minute for every hour, or based on some other apportioning scheme.

Stage 506 selects content for a second portion of the content request based on the default/automatic selection process. For example, the selection engine 206 can select content for a second portion of the content request based on the default/automatic selection process. The portion can, for example, be based on a percentage distribution, e.g., 99% of all content requests; or on a time period, e.g., 59 minutes for every hour, or based on some other apportioning scheme.

Stage 508 evaluates performance of the content selected for the first portion of requests based on the one or more keywords against performance of the content selected for the second portion of content requests based on the default/automatic selection process. For example, the evaluation engine 202 can evaluate performance of the content selected for the first portion of requests based on the one or more keywords against performance of the content selected for the second portion of content requests based on the default/automatic selection process.

Stage 510 selects one of the default/automatic selection process or the one or more keywords as the content selection process based on the evaluation of the performance of the content selected for the first portion and the content select for the second portion. For example, the selection engine 206 can select one of the default/automatic selection process or the one or more keywords as the content selection process based on the evaluation. In some implementations, the process 500 can be utilized to perform periodic monitoring and re-evaluation of the selection processes.

Figure 6:
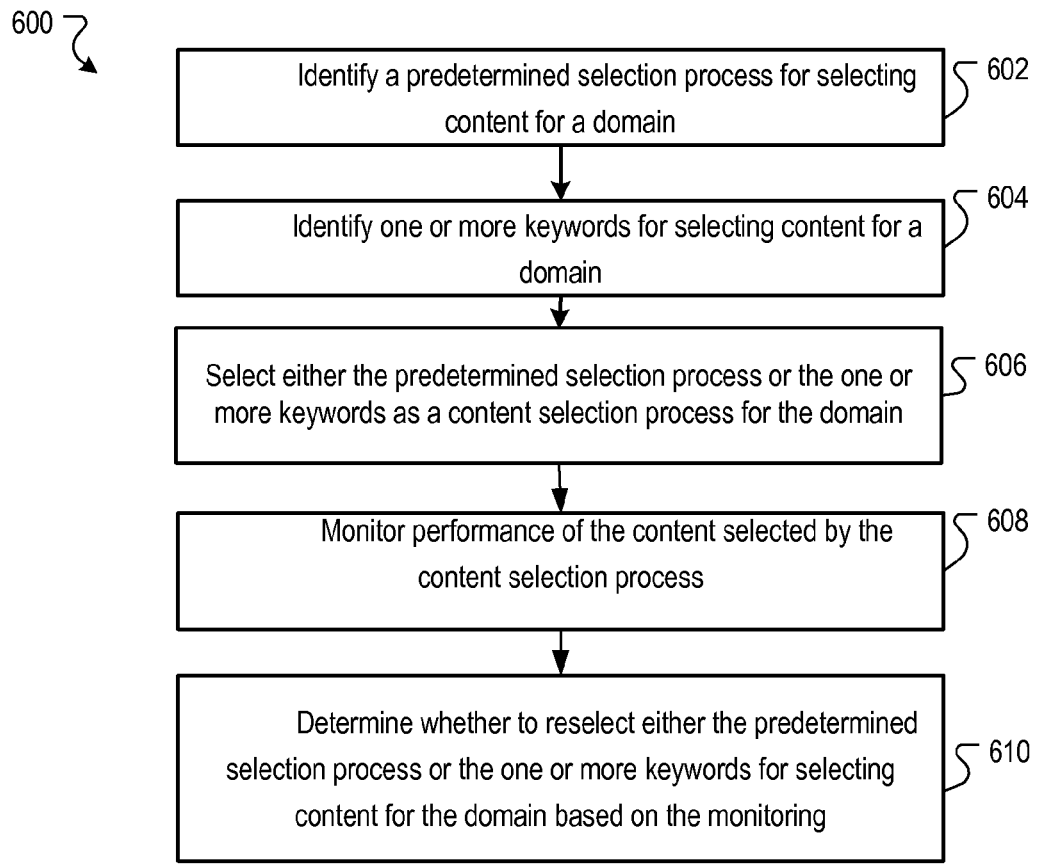
FIG. 6 is another example process for filtering content selection methods.

FIG. 6 is another example process 600 for filtering content selection methods. The process 600 can, for example, be implemented in a system such as the content selection evaluation system 200 of FIG. 2

Stage 602 identifies a predetermined selection process for selecting content for a domain. For example, the evaluation engine 202 can identify a predetermined selection process for selecting content for a domain. The predetermined selection process can, for example, be using one or more keywords selected by a publisher for selecting content for publisher's domain.

Stage 604 identifies one or more keywords for selecting content for a domain. For example, the evaluation engine 202 can identify one or more keywords for selecting content for a domain. The one or more keywords can, for example, be provided by the domain owner, or by some other party.

Stage 606 selects either the predetermined selection process or the one or more keywords as a content selection process for the domain. For example, the evaluation engine 202 can select either the predetermined selection process or the one or more keywords as a content selection process for the domain. The selection can be based, for example, on a predicted performance of content selected by each selection process; or based on historical performance of content selected by each selection process; or based on some other criterion.

Stage 608 monitors performance of the content selected by the content selection process. For example, the evaluation engine 202 can monitor performance of the content selected by the content selection process. The performance can be related to an aggregate click-through rate, an aggregate revenue value, or some other performance metric.

Stage 610 determines whether to reselect either the predetermined selection process or the one or more keywords for selecting content for the domain based on the monitoring. For example, the evaluation engine 202 can determine whether to reselect either the predetermined selection process or the one or more keywords for selecting content for the domain based on the monitoring.

Figure 7:
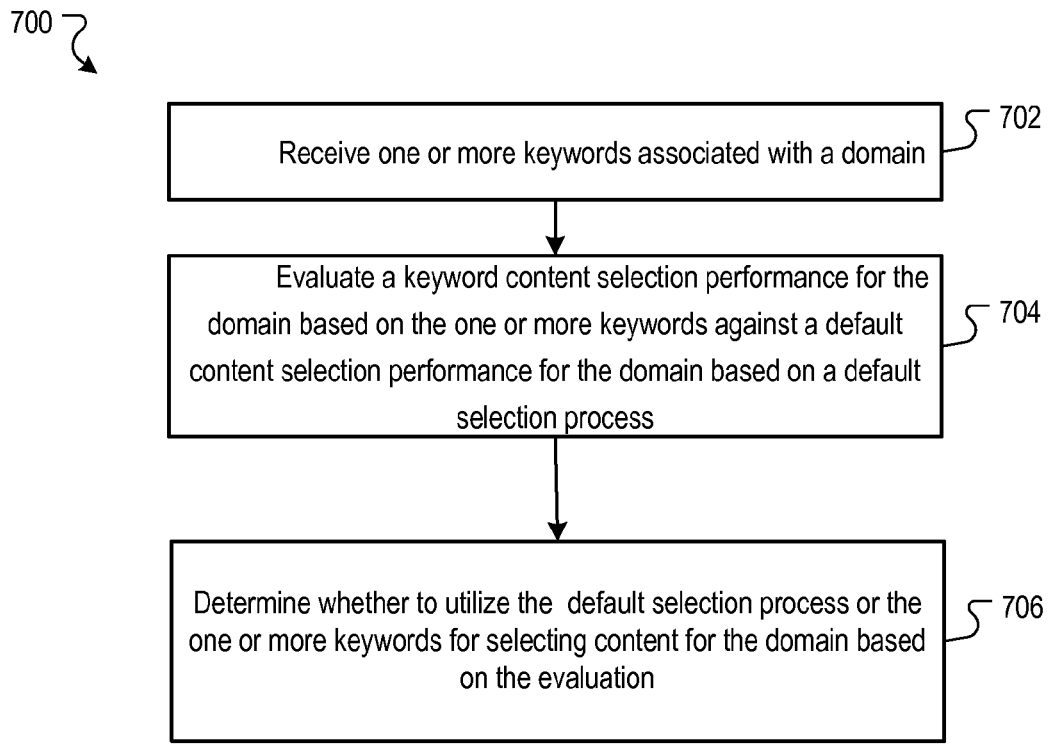
FIG. 7 is another example process for filtering content selection methods.

FIG. 7 is another example process 700 for filtering content selection methods. The process 700 can, for example, be implemented in a system such as the content selection evaluation system 200 of FIG. 2.

Stage 702 receives one or more keywords associated with a domain. For example, the evaluation engine 202 can receive one or more keywords associated with a domain from a domain registrar.

Stage 704 evaluates a keyword content selection performance for the domain based on the one or more keywords against a default content selection performance for the domain based on a default/automatic selection process. For example, the evaluation engine 202 can evaluate a keyword content selection performance for the domain based on the one or more keywords against a default content selection performance for the domain based on a default/automatic selection process. The performance can, for example, be based on observed performance metrics related to selected content.

Stage 706 determines whether to utilize the default/automatic selection process or the one or more keywords for selecting content for the domain based on the evaluation. For example, the evaluation engine 202 can determine whether to utilize the default/automatic selection process or the one or more keywords for selecting content for the domain based on the evaluation.

Figure 8:
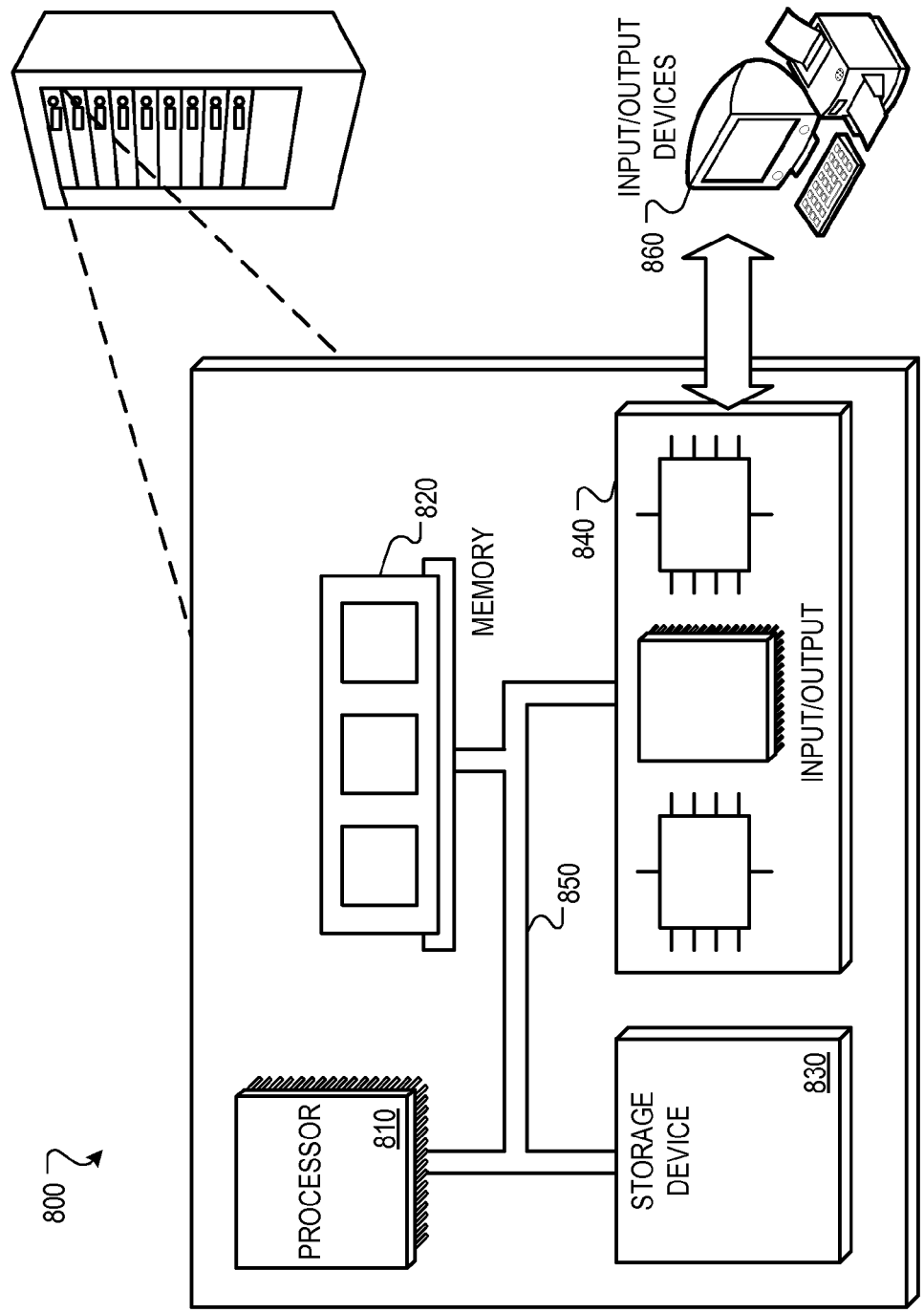
FIG. 8 is a schematic diagram of an example computer system that can be utilized to implement the systems and methods described herein.

FIG. 8 is block diagram of an example computer system 800. The system 800 includes a processor 810, a memory 820, a storage device 830, and an input/output device 840. Each of the components 810, 820, 830, and 840 can, for example, be interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 can, for example, include a hard disk device, an optical disk device, or some other large capacity storage device.

The input/output device 840 provides input/output operations for the system 800. In one implementation, the input/output device 840 can include one or more network interface devices, e.g., an Ethernet card, a serial communication device, e.g., and a RS-232 port, and/or a wireless interface device, e.g., and an 802.11 card. In another implementation, the input/output device can include driver devices configured to receive input data and send output data to other input/output devices, e.g., keyboard, printer and display devices 860. Other implementations, however, can also be used, such as mobile computing devices, mobile communication devices, set-top box television client devices, etc.

Although the above description refers to a content item such as an advertisement, content items such as video and/or audio files, web pages for particular subjects, news articles, etc. can also be used. For example, if a user clicks on a video file, then the owner or publisher of the video file can also generate revenue every time a user clicks on the video file. A threshold measure can also be determined for the video file according to one or more parameters associated with the video file, e.g., a click-through rate and/or a cost-per-click of the video file.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
receiving advertisement requests related to a domain having a domain name;
receiving, at a server system, one or more keywords associated with the domain, each of the one or more keywords selected by a publisher;
selecting, at the server system, advertisements for a first portion of the advertisement requests based on the one or more keywords for display on the domain;
parsing, at the server system, the domain name of the domain;
selecting, at the server system, advertisements for a second portion of the advertisement requests based on the parsing of the domain name for display on the domain;
evaluating, at the server system, performance of the advertisements selected for the first portion of advertisement requests based on the one or more keywords and displayed on the domain against performance of the advertisements selected for the second portion of advertisement requests based on the parsing of the domain name and displayed on the domain;
based on the evaluation of the performance of the advertisements selected for the first portion and the advertisements selected for the second portion, selecting, at the server system, either the one or more keywords or the parsing of the domain name as a selection basis for selecting advertisements to display on the domain;

selecting, at the server system, advertisements based on the selection basis for display on the domain; and providing, by the server system, for display on the domain, the advertisements that are selected based on the selection basis.

2. The method of claim 1, comprising:

periodically evaluating the performance of advertisements selected based on the unselected one or more keywords or the parsing of the domain name against the performance of advertisements selected based on the selection basis being used to display advertisements on the domain.

3. The method of claim 2, comprising:

reselecting either the parsing of the domain name or the one or more keywords as the selection basis for displaying advertisements on the domain based on the periodic evaluation.

4. The method of claim 1, comprising:

determining whether the one or more keywords have been modified; and if the one or more keywords have been modified, then reevaluating the performance of advertisements selected based on the parsing of the domain name against the performance of advertisements selected based on the one or more keywords; and reselecting one of the parsing of the domain name or the one or more keywords as the selection basis for displaying advertisements on the domain based on the reevaluation.

5. The method of claim 1, wherein the performance of the advertisements is based on click statistics.

6. A system, comprising:

a data store configured to store one or more keywords associated with a domain; and an evaluation engine that:

receives advertisement requests related to a domain having a domain name;

receives one or more keywords associated with the domain, each of the one or more keywords selected by a publisher;

selects advertisements for a first portion of the advertisement requests based on the one or more keywords for display on the domain;

parses the domain name of the domain;

selects advertisements for a second portion of the advertisement requests based on the parsing of the domain name for display on the domain;

evaluates performance of the advertisements selected for the first portion of the advertisement requests based on the one or more keywords and displayed on the domain against performance of the advertisements selected for the second portion of the advertisement requests based on the parsing of the domain name and displayed on the domain;

based on the evaluation of the performance of the advertisements selected for the first portion and the advertisements selected for the second portion, selects either the one or more keywords or the parsing of the domain name as a selection basis for a selection engine for selecting advertisements to display on the domain; and provides for display on the domain, the advertisements that are selected based on the selection basis.

7. The system of claim 6, wherein the evaluation engine:

periodically evaluates the performance of advertisements selected based on the unselected one of the parsing of the domain name or the one or more keywords against the performance of advertisements selected based on the selection basis.

8. The system of claim 7, wherein the evaluation engine: reselects either the parsing of the domain name or the one or more keywords as the selection basis for the selection engine for displaying advertisements on the domain based on the periodic evaluation.

9. A computer storage device encoded with a computer program, the program comprising instructions that when executed by a server system cause the server system to perform operations comprising:

receiving advertisement requests related to a domain having a domain name;

receiving one or more keywords associated with the domain, each of the one or more keywords selected by a publisher;

selecting advertisements for a first portion of the advertisement requests based on the one or more keywords for display on the domain;

parsing the domain name of the domain;

selecting advertisements for a second portion of the advertisement requests based on the parsing of the domain name for display on the domain;

evaluating performance of the advertisements selected for the first portion of the advertisement requests based on the one or more keywords and displayed on the domain against performance of the advertisements selected for the second portion of the advertisement requests based on the parsing of the domain name and displayed on the domain;

based on the evaluation of the performance of the advertisements selected for the first portion and the advertisements selected for the second portion, selecting either the one or more keywords or the parsing of the domain name as a selection basis for selecting advertisements to display on the domain;

selecting advertisements based on the selection basis for display on the domain; and providing, for display on the domain, the advertisements that are selected based on the selection basis.

10. The computer storage device of claim 9 wherein the operations further comprise:

periodically evaluating the performance of advertisements selected based on the unselected one of the parsing of the domain name or the one or more keywords against the performance of advertisements selected based on the selection basis.

11. The computer storage device of claim 10 wherein the operations further comprise:

reselecting either the parsing of the domain name or the one or more keywords as the selection basis for displaying advertisements on the domain based on the periodic evaluation.

* * * * *